US009081507B2

(12) United States Patent
Vemuri et al.

(10) Patent No.: US 9,081,507 B2
(45) Date of Patent: Jul. 14, 2015

(54) SHARED STORAGE ACCESS MANAGEMENT SYSTEMS AND METHODS (75) Inventors: Hari Krishna Vemuri, Maharashtra (IN); Niranjan Pendharkar, Pune (IN)

(73) Assignee: Symantec Corporation, Mountain View, CA (US)

( * ) Notice: Subject to any disclaimer, the term of this patent is extended or adjusted under 35 U.S.C. 154(b) by 208 days.

(21) Appl. No.: 13/420,283

(22) Filed: Mar. 14, 2012

(65) Prior Publication Data

US 2013/0246666 A1    Sep. 19, 2013

(51) Int. Cl.
*G06F 3/00* (2006.01)
*G06F 3/06* (2006.01)

(52) U.S. Cl.
CPC .............. *G06F 3/0622* (2013.01); *G06F 3/067* (2013.01); *G06F 3/0659* (2013.01)

(58) Field of Classification Search
CPC ........... G06F 3/00; G06F 3/06; G06F 3/0627; G06F 3/0629; G06F 3/0653
See application file for complete search history.

(56) References Cited

U.S. PATENT DOCUMENTS

| | | | | |
|---|---|---|---|---|
| 5,088,031 | A * | 2/1992 | Takasaki et al. ............... | 718/100 |
| 6,779,083 | B2 * | 8/2004 | Ito et al. .......................... | 711/114 |
| 6,820,168 | B2 * | 11/2004 | Tanaka et al. ...................... | 711/6 |
| 7,313,636 | B2 * | 12/2007 | Qi ..................................... | 710/5 |
| 7,548,999 | B2 * | 6/2009 | Haertel et al. ................... | 710/62 |
| 7,631,066 | B1 * | 12/2009 | Schatz et al. ................... | 709/224 |
| 7,739,541 | B1 * | 6/2010 | Rao et al. ........................ | 714/4.1 |
| 8,281,071 | B1 * | 10/2012 | Vohra et al. .................... | 711/114 |
| 8,370,494 | B1 * | 2/2013 | Chen et al. ..................... | 709/226 |
| 8,386,745 | B2 * | 2/2013 | Kegel et al. .................... | 711/205 |
| 8,495,323 | B1 * | 7/2013 | Tatavarty ....................... | 711/164 |
| 2004/0123053 | A1 * | 6/2004 | Karr et al. ...................... | 711/152 |
| 2005/0120141 | A1 * | 6/2005 | Zur et al. ........................ | 709/249 |
| 2005/0278465 | A1 * | 12/2005 | Qi ..................................... | 710/36 |
| 2007/0083657 | A1 * | 4/2007 | Blumenau et al. ............. | 709/226 |
| 2007/0106992 | A1 * | 5/2007 | Kitamura ........................ | 718/104 |
| 2008/0040626 | A1 * | 2/2008 | Karr et al. ...................... | 713/500 |
| 2008/0162735 | A1 * | 7/2008 | Voigt et al. ........................ | 710/6 |
| 2008/0183965 | A1 * | 7/2008 | Shiga et al. .................... | 711/114 |
| 2010/0150174 | A1 * | 6/2010 | Bhide et al. .................... | 370/474 |
| 2010/0191887 | A1 * | 7/2010 | Serebrin ......................... | 710/267 |
| 2010/0250785 | A1 * | 9/2010 | Shin et al. ........................ | 710/3 |
| 2011/0023027 | A1 * | 1/2011 | Kegel et al. ...................... | 718/1 |
| 2011/0087814 | A1 * | 4/2011 | Liu et al. ........................ | 710/260 |
| 2011/0314182 | A1 * | 12/2011 | Muppirala et al. ................ | 710/5 |
| 2012/0066413 | A1 * | 3/2012 | Tokoro et al. ..................... | 710/6 |
| 2013/0080715 | A1 * | 3/2013 | Mori et al. ..................... | 711/154 |
| 2013/0227559 | A1 * | 8/2013 | Tsirkin ............................. | 718/1 |

* cited by examiner

*Primary Examiner* — Jing-Yih Shyu
(74) *Attorney, Agent, or Firm* — Wilmer Cutler Pickering Hale and Dorr LLP (57) ABSTRACT Shared storage access management systems and methods are presented. A method can comprise: performing an endpoint I/O source authority tracking process in which permission of an endpoint I/O source to perform an I/O with at least a portion of an endpoint storage target is tracked at least in part based on a corresponding endpoint I/O source ID value, and performing an I/O operation based upon results of the endpoint I/O source authority tracking process. In one embodiment, the endpoint I/O source ID value is associated with an endpoint I/O source that is a virtual machine. The endpoint I/O source ID value can be unique and can be bound to an endpoint I/O source. In one exemplary implementation, the endpoint I/O source ID value does not depend upon intermediate communication channel characteristics between a corresponding endpoint I/O source and endpoint storage target.

18 Claims, 8 Drawing Sheets

210
Performing an endpoint I/O source authority tracking process in which permission of an endpoint I/O source to perform an I/O with at least a portion of an endpoint storage target is tracked at least in part based on a corresponding endpoint I/O source ID value.

---

220
Performing an I/O operation in accordance with results of the endpoint I/O source authority tracking process.

310
Performing an endpoint storage target support confirmation process.

---

320
Performing an endpoint I/O source ID value generation process.

---

330
Performing an endpoint I/O source ID value initial registration process.

---

340
Performing an endpoint I/O source ID value update registration process.

410
Receiving an indication of an endpoint I/O source ID value update registration trigger.

420
Updating an endpoint I/O source ID value registration based upon receipt of the endpoint I/O source ID value update registration trigger.

510
Determining if a split link scenario occurs.

520
Establishing a surviving node.

530
Confirming validity of an endpoint I/O source ID value associated with an endpoint I/O source in a surviving node.

540
Invalidating the endpoint I/O source ID value associated with an endpoint I/O source in a non-surviving node.

810
Endpoint I/O source authority tracking module.

811
Endpoint storage target support confirmation module.

812
Endpoint I/O source ID value generation module.

813
Endpoint I/O source ID value initial registration module.

814
Endpoint I/O source ID value update registration module.

820
I/O Operation Module.

SHARED STORAGE ACCESS MANAGEMENT SYSTEMS AND METHODS

FIELD OF THE INVENTION

The present embodiments relate to the field of storage management. In one embodiment, endpoint input/output (I/O) source ID values are established and utilized in storage management operations.

BACKGROUND OF THE INVENTION

Electronic systems and circuits are often utilized in a number of scenarios to achieve advantageous results. Numerous electronic technologies such as computers, video equipment, and communication systems facilitate increased productivity and cost reduction in analyzing and communicating information in most areas of business, science, education and entertainment. Frequently, these activities involve storage of vast amounts of information and it is usually important that the storage of the information is accurate and reliable. Traditional storage management approaches can often have limited flexibility and success in maintaining accuracy and reliability, especially in environments that include virtual machines.

Some traditional approaches to maintaining accuracy involve an ID that is dependent upon physical components in a communication connection or link. However, as virtualization becomes more prevalent, there are often scenarios where two virtual machines share the same physical components in a communication connection or link to a shared storage resource (e.g., Initiate-Target link, physical adapter (initiator) for connection to the storage, etc.). The communication connection or link can fail or can be changed if the virtual machine migrates to another physical server. Traditional SCSI-3 based input/output (I/O) fencing attempts at data corruption protection cannot typically be used for I/O fencing in a situation where a link fails or is changed. In a typical traditional approach when a link fails or is changed the virtual machines usually no longer have a unique ID with which they can register with the storage to get shared access.

In attempting to achieve I/O fencing (e.g., protection from data corruption in case of failure of cluster heart-beat, etc.) some traditional approaches attempted to use SCSI-3 Persistent Reservations which require each participating host to have a unique set of initiator IDs registered with the target storage device. When one of the nodes is removed from the cluster, its key is removed from the reservation set so that it could no longer issue an I/O to the storage device. In one conventional approach, an end port ID virtualization (NPIV) provides an alternative where a unique virtual adapter and thus initiator ID is granted to each virtual machine but this is restricted to the number of virtual adapters that a given physical adapter can support. In addition, the end-switches typically need to be NPIV aware and the identity is yet again assigned to the connection or link with the storage and hence can change depending on how the host accesses the storage. If multiple adapters are used then all typically have to be SCSI-3 PR registered with the storage device, usually leading to complicated and cumbersome reservation management.

SUMMARY

Storage management systems and methods are presented. In one embodiment, a method comprises: performing an endpoint input/output (I/O) source authority tracking process in which permission of an endpoint I/O source to perform an I/O with at least a portion of an endpoint storage target is tracked at least in part based on a corresponding endpoint I/O source ID value; and performing an I/O operation based upon results of the endpoint I/O source authority tracking process. In one embodiment, the endpoint I/O source ID value is associated with an endpoint I/O source that is a virtual machine. The endpoint I/O source ID value can be unique and can be bound to a respective endpoint I/O source. In one exemplary implementation, the endpoint I/O source ID value does not depend upon intermediate communication channel characteristics between a corresponding respective endpoint I/O source and the endpoint storage target.

In one embodiment, the authority tracking process includes: performing an endpoint storage target support confirmation process; performing an endpoint I/O source ID value generation process; performing an endpoint I/O source ID value initial registration process; and performing an endpoint I/O source ID value update registration process. The endpoint storage target support confirmation process can include confirming an endpoint storage target supports endpoint I/O source ID value registration and commands corresponding to registration operations. The endpoint I/O source ID value can be registered with the endpoint storage target. It is appreciated the endpoint I/O source ID value can be associated with any endpoint source of an I/O. The endpoint I/O source ID value can be associated with a respective virtual machine. The endpoint I/O source ID value can be included in a table of endpoint I/O source ID values that indicate corresponding endpoint I/O sources have valid authority or permission to perform an I/O access.

In one embodiment, an endpoint I/O source ID value update registration process includes: receiving an indication of an endpoint I/O source ID value update registration trigger; and updating an endpoint I/O source ID value registration based upon receipt of the endpoint I/O source ID value update registration trigger. An endpoint I/O source ID value registration can be updated based upon receipt of an endpoint I/O source ID value update registration trigger, wherein the endpoint I/O source ID value update registration trigger includes at least one of an indication of a split link scenario and an indication of a cluster reconfiguration scenario. In one exemplary implementation, the endpoint I/O source authority tracking process includes: determining if a split link scenario occurs; establishing a surviving node; confirming validity of an endpoint I/O source ID value associated with an endpoint I/O source in a surviving node; and invalidating the endpoint I/O source ID value associated with an endpoint I/O source in a non-surviving node. The endpoint I/O source ID value can be included in a field of an I/O request. The field can be compatible with a SCSI-3 protocol. The field can be a Group ID field. The endpoint I/O source ID value can be non-zero.

In one embodiment, a reprogrammable tangible computer readable medium has stored thereon, computer executable instructions that when executed by a computer system cause the computer system to perform a method comprising: performing an endpoint I/O source authority tracking process in which permission of an endpoint I/O source to perform an I/O with at least a portion of an endpoint storage target is tracked at least in part based on a corresponding endpoint I/O source ID value, and performing an I/O operation based upon results of the endpoint I/O source authority tracking process. In one exemplary implementation, the endpoint I/O source ID value is associated with an endpoint I/O source that is a virtual machine, and the endpoint I/O source ID value is unique and is bound to a respective endpoint I/O source. The endpoint I/O source ID value tracking process can include: determining if a split link scenario occurs; establishing a surviving node; confirming validity of an endpoint I/O source ID value associated with an endpoint I/O source in a surviving node; and invalidating the endpoint I/O source ID value associated with an endpoint I/O source in a non-surviving node.

In one embodiment, a computer system comprises: a processor coupled to a computer readable storage media and executing computer readable code which causes the computer system to perform operations including: performing an endpoint I/O source authority tracking process in which permission of an endpoint I/O source to perform an I/O with at least a portion of an endpoint storage target is tracked at least in part based on a corresponding endpoint I/O source ID value, and performing an I/O operation based upon results of the endpoint I/O source authority tracking process. In one exemplary implementation, the endpoint I/O source ID value is associated with an endpoint I/O source that is a virtual machine, and the endpoint I/O source ID value is unique and bound to a respective endpoint I/O source. The endpoint I/O source ID value tracking process can include: determining if a split link scenario occurs; establishing a surviving node; confirming validity of an endpoint I/O source ID value associated with an endpoint I/O source in a surviving node; and invalidating the endpoint I/O source ID value associated with an endpoint I/O source in a non-surviving node.

DESCRIPTION OF THE DRAWINGS

The accompanying drawings, which are incorporated in and form a part of this specification, are included for exemplary illustration of the principles of the present embodiments and not intended to limit the present invention to the particular implementations illustrated therein. The drawings are not to scale unless otherwise specifically indicated.

DETAILED DESCRIPTION

Reference will now be made in detail to the preferred embodiments, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope as defined by the appended claims. Furthermore, in the following detailed description, numerous specific details are set forth in order to provide a thorough understanding. However, one ordinarily skilled in the art will understand that the present invention may be practiced without these specific details. In other instances, well known methods, procedures, components, and circuits have not been described in detail as not to unnecessarily obscure aspects of the current invention.

The systems and methods described in the following sections of the detailed description can facilitate efficient and effective information storage. In one embodiment, an endpoint input/output (I/O) source ID value (e.g., an identity of the virtual machine, etc.) is stored with a storage target. Access authority or permission to perform an I/O is at least in part determined by the endpoint I/O source ID value registration status with the storage target. In one embodiment, I/O fencing and split link scenarios can be handled in environments in which an endpoint I/O source is a virtual machine. In one exemplary implementation, the I/O access authority of a virtual machine is not tied to a physical connection. That allows I/O fencing to be implemented independent of physical bindings of the virtual machine (e.g., end to end without the requirement of binding with the physical connection of the virtual machine with the storage, etc.). The physical connection can be shared or changed. In one exemplary implementation, storage access I/O fencing among virtual machines that share the same connection to a SAN storage can be realized.

Figure 1:
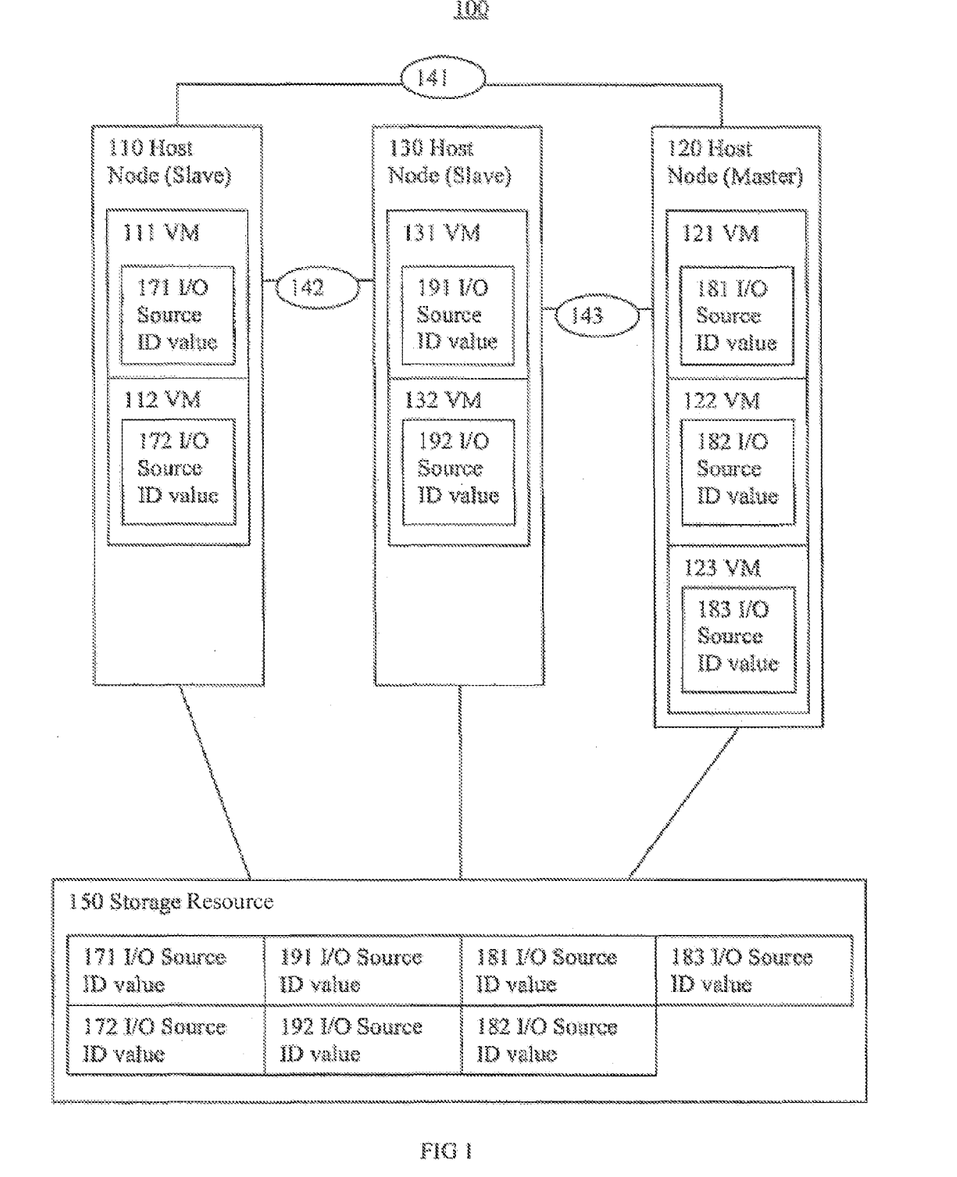
FIG. 1 is a block diagram of an exemplary cluster system in accordance with one embodiment of the present invention.

FIG. 1 is a block diagram of exemplary cluster system 100 in accordance with one embodiment of the present invention. Cluster system 100 includes host node 110, host node 120, host node 130, and storage resource 150. Host node 110 includes virtual machines 111 and 112. Host node 120 includes virtual machines 121, 122 and 123. Host node 130 includes virtual machines 131 and 132. In one embodiment host nodes 110 and 130 are slaves and host node 120 is a master. Host node 110, 120 and 130 are communicatively coupled to storage resource 150.

The components of cluster system 100 cooperatively operate to store information. The virtual machines included in host nodes 110, 120 and 130 process information. Storage resource 150 includes a storage media for storing information. It is appreciated that storage resource 150 can include various storage media (e.g., disk arrays, hard disks, flash drives, RAM, etc.). In it also appreciated that storage resource 150 can be a portion (e.g., region, block, etc.) of a storage device and authority or permission to perform an I/O access to that portion can be checked or verified (e.g., on a region basis rather than the whole device, etc.). The storage resource 150 tracks endpoint I/O source ID values associated with the respective virtual machines. The endpoint I/O source ID values are associated with the endpoint virtual machine without the requirement of also binding the endpoint I/O source ID values to physical connections or links associated with the virtual machine. In one embodiment, the endpoint I/O source ID values indicate whether a virtual machine has authority to access a storage resource for I/O operations. In one embodiment, each of the virtual machines 111, 112, 131, 132, 121, 122, and 123 are granted access to the storage resource 150 in accordance with registration status of each of the corresponding endpoint I/O source ID values 171, 172, 191, 192, 181, 182 and 183 respectively.

In one embodiment, an endpoint I/O source ID value (e.g., 171, 172, etc.) is established and "bound to" or associated with a virtual machine (e.g., 111, 112, etc.). The endpoint I/O source ID value (e.g., 171, 172, etc.) is also registered with the storage resource 150. When a virtual machine (e.g., 111, 112, etc.) attempts to perform an I/O access of storage resource 150 a corresponding endpoint I/O source ID value (e.g., 171, 172, etc.) is forwarded with the I/O access request. Access to the storage (e.g., whole storage device, portion of a storage device, storage region, etc.) for the I/O operation is allowed or prevented based at least in part on the status of the endpoint I/O source ID value registration with the storage resource 150. If the endpoint I/O source ID value is registered with the storage resource as allowing an I/O access the corresponding virtual machine is allowed to perform an I/O otherwise the I/O is prevented.

In one embodiment, links 141, 142 and 143 are communication links that enable the host nodes 110, 120 and 130 to communicate with one another. The communication can include various cluster management information. The cluster management information can include indications of which nodes belong to a cluster. The communication can also include handshaking or heart beating to indicate to a node that the other nodes are operational. If a communication link 141, 142 or 143 fails or goes down while the respective previously coupled node(s) remain operational causing a split link scenario, the endpoint I/O source ID values can be utilized to establish effective fencing and resolve potential consistency issues. In one exemplary implementation, one of the host nodes is considered the surviving host node and it registers its corresponding endpoint I/O source ID value with the storage resource and endpoint I/O source resource values associated with the other host nodes are unregistered or removed.

Storage resource 150 can be organized in a logical unit number storage component (LUN) configuration. A logical unit number storage component (LUN) is a logical or virtual grouping of storage resources. While the present embodiment shows a single storage resource 150, it is appreciated that a storage component of a LUN can span or be partially located in multiple storage resources.

Figure 2:
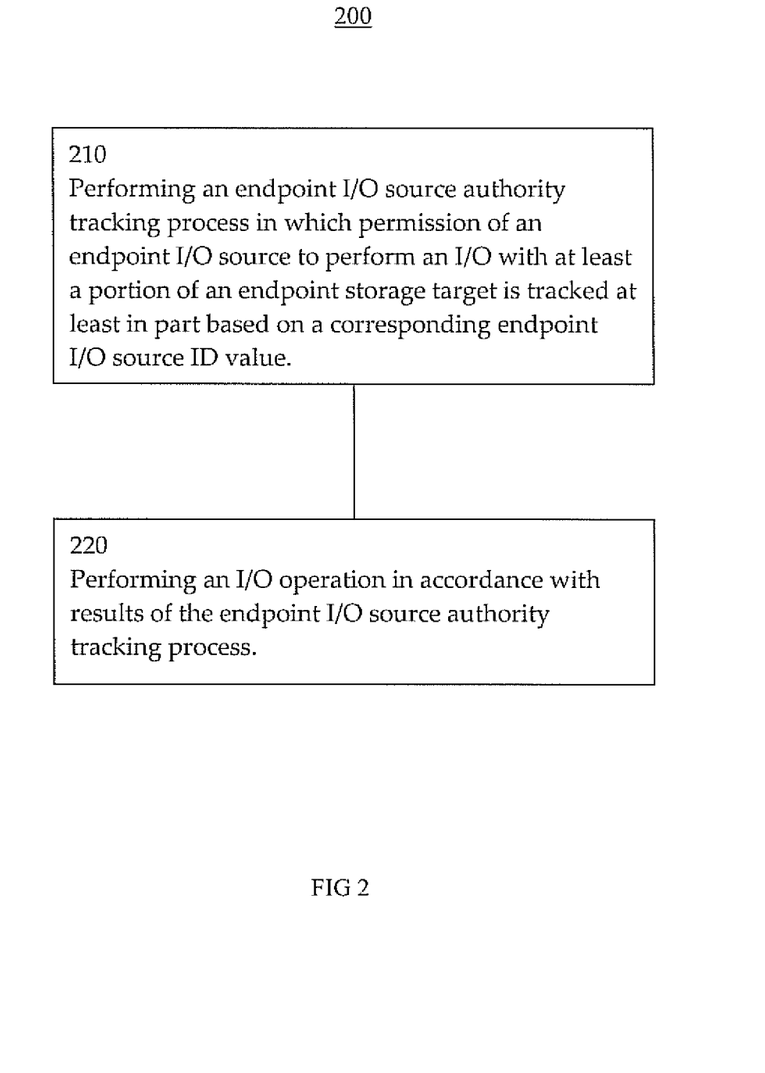
FIG. 2 is a flow chart of an exemplary storage management method in accordance with one embodiment of the present invention.

FIG. 2 is a flow chart of exemplary storage management method 200 in accordance with one embodiment of the present invention. In one embodiment, management method 200 includes fencing features that help prevent corruption and inconsistencies in stored information.

In block 210, an endpoint I/O source authority tracking process is performed. In one embodiment, authority or permission for an endpoint I/O source to perform an I/O with at least a portion of an endpoint storage target is tracked at least in part based on a corresponding endpoint I/O source ID value. The endpoint I/O source can be a virtual machine. In one exemplary implementation, the endpoint I/O source authority tracking process includes registering an endpoint I/O source ID value with an endpoint storage target if the endpoint I/O source associated with the endpoint I/O source ID value is authorized to perform an I/O. In one embodiment, the endpoint I/O source ID value can be independent of intermediate communication channel characteristics (e.g., physical host, physical communication cards, etc.) between a corresponding endpoint I/O source and endpoint storage target. In one exemplary implementation, multiple virtual machines are implemented on the same physical host and the authority of one virtual machine endpoint I/O source to perform an I/O on an endpoint storage target does not depend upon the authority status of another virtual machine I/O source.

In block 220, an I/O operation is performed in accordance with results of the endpoint I/O source authority tracking process. In one embodiment, an I/O between an endpoint I/O source and endpoint storage target will be permitted to proceed if an endpoint I/O source ID value corresponding to the endpoint I/O source is registered with the endpoint storage target as authorized to perform an I/O. In one embodiment, the endpoint I/O source ID value is communicated with an I/O request. The endpoint I/O source ID value can be included in a field of an I/O request. In one exemplary implementation, the I/O request is compatible with SCSI-3 protocol. The field can be a Group ID field.

Figure 3:
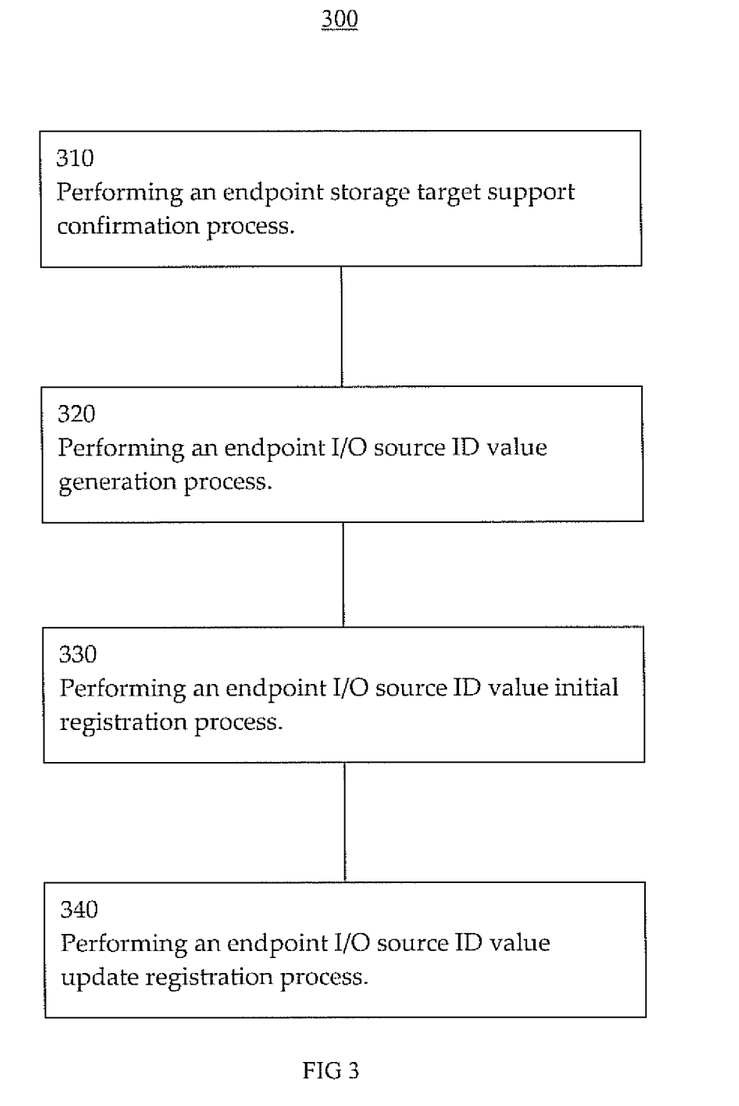
FIG. 3 is a flow chart of an exemplary endpoint input/output (I/O) authority tracking process in accordance with one embodiment of the present invention.

FIG. 3 is a flow chart of exemplary endpoint input/output (I/O) source authority tracking process 300 in accordance with one embodiment of the present invention. In one embodiment, endpoint input/output (I/O) source authority tracking process 300 is similar to an endpoint input/output (I/O) source authority tracking process performed in block 210. In one exemplary implementation, authority or permission for an endpoint I/O source to perform an I/O with at least a portion of an endpoint storage target is tracked at least in part based on a corresponding endpoint I/O source ID value.

In block 310, an endpoint storage target support confirmation process is performed. In one embodiment, an endpoint storage target support confirmation process includes confirming an endpoint storage target supports the use of endpoint I/O source ID value registration and commands corresponding to registration operations. In one exemplary implementation, the support can include compatibility with SCSI-3 protocol and use of group ID fields.

In block 320, an endpoint I/O source ID value generation process is performed. In one embodiment, the endpoint I/O source ID value is associated with an I/O source. In one exemplary implementation, the endpoint I/O source ID value is unique to a respective I/O source. The endpoint I/O source ID value can be non-zero.

In block 330, an endpoint I/O source ID value initial registration process is performed. In one embodiment, the endpoint I/O source ID value is bound to an endpoint I/O source. In one exemplary implementation, the endpoint I/O source ID value is registered as being associated with an endpoint I/O source that is authorized to access an endpoint storage target. In one embodiment, an endpoint I/O source ID value is registered in an endpoint storage component and each endpoint I/O source ID value is associated with a respective virtual machine. In one exemplary implementation, an endpoint I/O source ID value is included in a table of endpoint I/O source ID values that indicate corresponding endpoint I/O sources have valid authority or permission to perform an I/O access.

In block 340, an endpoint I/O source ID value update registration process is performed. In one embodiment, an endpoint I/O source ID value update registration process includes updating registration of endpoint I/O source ID values established in block 330. In one exemplary implementation, a surviving node in a split link scenario directs the endpoint I/O source ID value update registration process.

Figure 4:
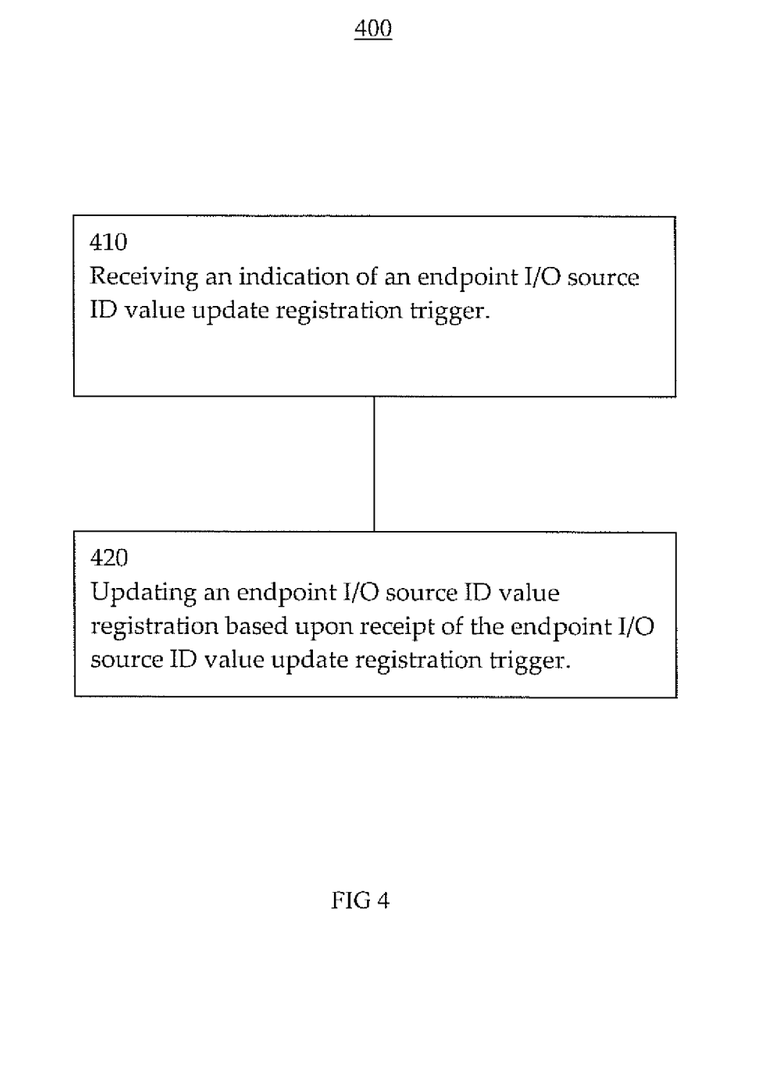
FIG. 4 is a block diagram of an exemplary endpoint I/O source ID value update registration process in accordance with one embodiment of the present invention.

FIG. 4 is a block diagram of exemplary endpoint I/O source ID value update registration process 400 in accordance with one embodiment of the present invention. In one embodiment, endpoint I/O source ID value update registration process 400 is similar to an endpoint I/O source ID value update registration process performed in block 340. It is appreciated that a endpoint I/O source ID value registration can be updated for a variety of reasons (e.g., a split link condition, a new node is added to a cluster, etc.).

In block 410, an indication of an endpoint I/O source ID value update registration trigger is received. It is appreciated there can be a variety of triggers. A trigger can result from a new endpoint I/O source (e.g., virtual machine, host, node, etc.) being added to a cluster. A trigger can result from an operation or condition (e.g., virtual machine fails, host fails, a communication link fails, a split link scenario, cluster reconfiguration, etc.) that affects the accuracy or integrity of the endpoint I/O source ID value. A cluster reconfiguration scenario can include adding a new node to a cluster. A cluster reconfiguration scenario can include removing a node from a cluster. Removal of a node from a cluster can be planned or unplanned (e.g., a interruption in communications with the node, a node system crashing or failing, etc.).

In block 420, an endpoint I/O source ID value registration is updated based upon receipt of the endpoint I/O source ID value update registration trigger. In one embodiment, in response to a trigger indication of a new endpoint I/O source, a new endpoint I/O source ID value is generated (e.g., similar to block 320, etc.) and the new endpoint I/O source ID value is registered with an endpoint storage target (e.g., similar to block 330, etc.). In one embodiment, in response to a trigger indication of a failed component (e.g., virtual machine, new endpoint I/O source, etc.) the corresponding endpoint I/O source ID value is unregistered with an endpoint storage target. In one exemplary implementation, an endpoint I/O source ID value can be utilized in the resolution of issues associated with a split link scenario (e.g., which endpoint I/O source ID values indicate valid I/O access authority, etc.). The endpoint I/O source ID value registration can be updated based upon receipt of the endpoint I/O source ID value update registration trigger, wherein the endpoint I/O source ID value update registration trigger includes at least one of an indication of a split link scenario and an indication of a cluster reconfiguration scenario. An endpoint I/O source ID value can also be utilized in the establishment of effective I/O fencing. It is appreciated that I/O fencing can be utilized to provide protection from data corruption in a variety of scenarios or situations (e.g., in case of failure of cluster heartbeat, if a node joins a cluster, if a node leaves a cluster for planned or unplanned reasons, etc.).

Figure 5:
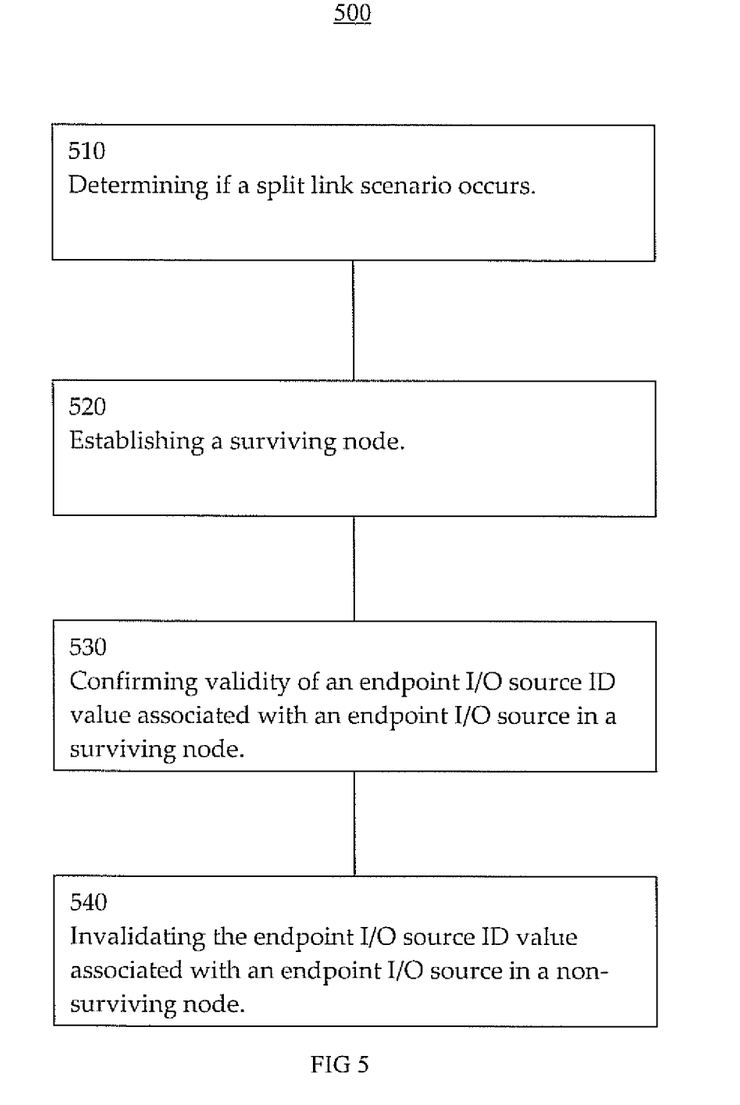
FIG. 5 is a block diagram of an exemplary endpoint I/O source ID value tracking process in accordance with one embodiment of the present invention.

FIG. 5 is a block diagram of exemplary endpoint I/O source ID split link resolution process 500 in accordance with one embodiment of the present invention. In one embodiment, endpoint I/O source ID value tracking process 500 includes resolving split link scenario issues associated with an endpoint I/O source ID value. In block 510 a determination is made if a split link scenario has occurred. In block 520, a surviving node is established. In block 530, validity of an endpoint I/O source ID value associated with a surviving node is confirmed. In block 540, endpoint I/O source ID values associated with a non-surviving node are invalidated or unregistered. In one exemplary implementation, authority or permission for an endpoint I/O source to perform an I/O with at least a portion of an endpoint storage target is tracked at least in part based on a corresponding endpoint I/O source ID value.

In one exemplary implementation, endpoint I/O source ID value split link process 500 is similar to endpoint I/O source ID value update registration process 400. The indication of an endpoint I/O source ID value update registration trigger (e.g., of block 410, etc.) is an indication of a split link condition and the new endpoint I/O source ID value (e.g., of block 420) is associated with a surviving node. In one exemplary implementation, a previous endpoint I/O source ID value that remains valid is considered a new endpoint I/O source ID value.

In one embodiment, a present storage management approach is implemented in an environment compatible with the SCSI-3 standard. The SCSI-3 standard allows each I/O request (READ/WRITE) to have a group-ID or a number to which it belongs. This is designed to classify I/O requests into various groups but the definition of the group is left open according to the standard. In one embodiment of the invention, the group-ID field of the I/O request is used to designate the "virtual machine ID" from which the I/O request has been received in order to implement I/O fencing. In one exemplary implementation, the group-ID field of the I/O request includes an endpoint I/O source ID value. Additional descriptions of group-ID fields and I/O fencing in an SCSI-3 environment are set forth in following sections.

In one exemplary SCSI-3 implementation, each host performs an endpoint storage target support confirmation process. In one embodiment, the endpoint storage target support confirmation process is similar to an endpoint storage target support confirmation process performed in block 310. In one embodiment, a host in a cluster detects if the storage device supports I/O grouping by reading the GROUP_SUP bit of SCSI-3 VPD inquiry data.

In one exemplary SCSI-3 implementation, the endpoint storage target can support the following commands. A SET_GROUP_ID command to set the group ID that a given virtual machine can use to send I/Os originating from it. This can be stored persistently. A CLEAR_GROUP_ID command to free the group ID so that any other virtual machine can use it. A CHANGE_GROUP_IDs command to list the group IDs that are permissible to service an I/O.

In one exemplary SCSI-3 implementation, each endpoint I/O source (e.g., virtual machine, etc.) registers its group ID with which it would send its I/O requests with the storage. In one embodiment, each endpoint I/O source performs an endpoint I/O source ID value generation process and an endpoint I/O source ID value initial registration process are performed (e.g., similar to blocks 320 and 330). The group ID can also be registered with a cluster master and the cluster master then registers the set of allowed group IDs with the storage. The storage allows I/Os with a group ID field that is non-zero and is part of list of allowed group IDs to access storage for I/O operations. The I/Os without group IDs (e.g., ID 0, etc.) can continue to work as usual as they are not generated by the cluster members. When there is a requirement or it is desirable to fence out a set of hosts, the cluster master changes the group membership by re-registering the set of allowed group IDs with the storage.

Figure 6:
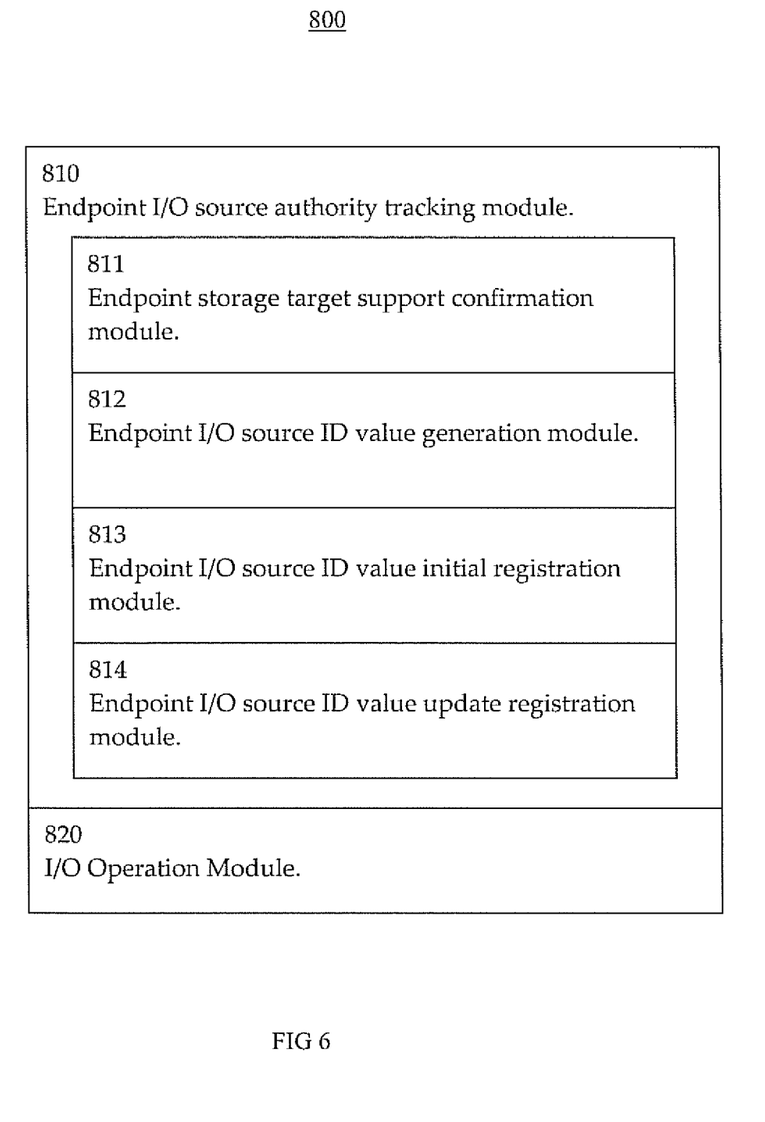
FIG. 6 is a block diagram of an exemplary storage management module which includes instructions for directing a processor in the performance of a storage management method in accordance with one embodiment of the present invention.

FIG. 6 is a block diagram of exemplary storage management module 800 which includes instructions for directing a processor in the performance of a storage management method (e.g., 200, 300 etc.) in accordance with one embodiment of the present invention. Storage management module 800 includes endpoint I/O source authority tracking module 810 and I/O operation module 820. Endpoint I/O source authority tracking module 810 includes instructions for performing an endpoint I/O source authority tracking process. In one embodiment, endpoint I/O source authority tracking module 810 includes instructions for performing an endpoint I/O source authority tracking process as indicated in block 210. The I/O operation module 820 includes instructions for performing an I/O operation process. In one embodiment, I/O operation module 820 includes instructions for performing an I/O operation process as indicated in block 220.

In one embodiment, endpoint I/O source authority tracking module 810 includes endpoint storage target support confirmation module 811, endpoint I/O source ID value generation module 812, endpoint I/O source ID value initial registration module 813 and endpoint I/O source ID value update registration module 814. In one exemplary implementation, endpoint storage target support confirmation module 811, endpoint I/O source ID value generation module 812, endpoint I/O source ID value initial registration module 813 and endpoint I/O source ID value update registration module 814 include instructions for performing an endpoint storage target support confirmation process (e.g., 310, etc.), an endpoint I/O source ID value generation process (e.g., 320, etc.), an endpoint I/O source ID value initial registration process (e.g., 330) and an endpoint I/O source ID value update registration process (e.g., 340), respectively.

Figure 7:
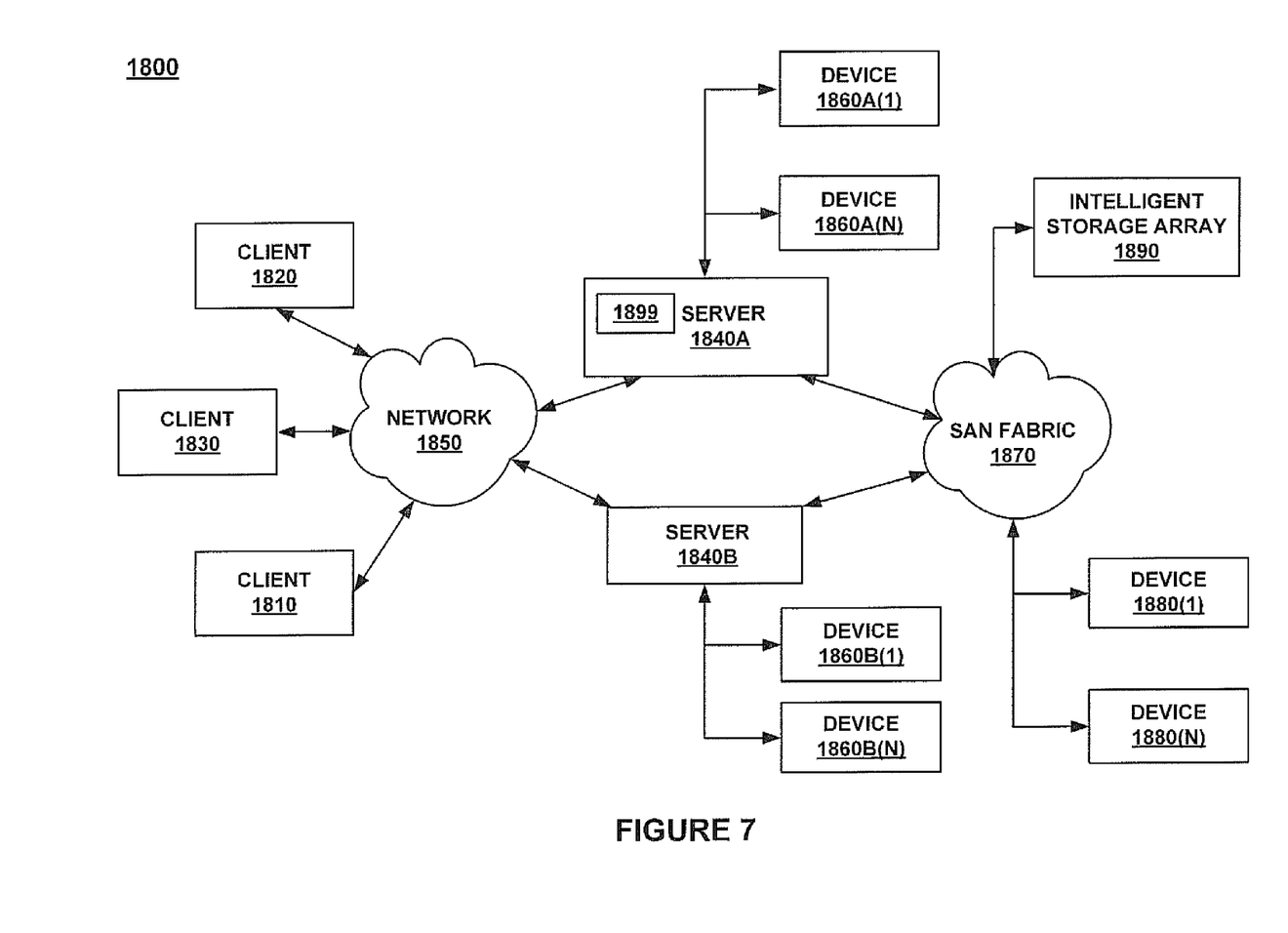
FIG. 7 is a block diagram depicting an exemplary network architecture in which client systems as well as storage servers, are coupled to a network in accordance with one embodiment of the present invention.

It is appreciated present storage management systems and methods can be implemented as part of a variety of environments. For example, storage management systems and methods can be implemented as part of a distributed computing environment, a cloud computing environment, a virtual environment, a client server environment, etc. In one embodiment, a storage method (e.g., method 200, 300, etc.) can be implemented on a network. FIG. 7 is a block diagram depicting an exemplary network architecture 1800 in which client systems 1810, 1820 and 1830, as well as storage servers 1840A and 1840B (any of which can be implemented using computer system 1110 from FIG. 8), are coupled to a network 1850. Storage server 1840A is further depicted as having storage devices 1860A (1)-(N) directly attached, and storage server 1840B is depicted with storage devices 1860B (1)-(N) directly attached. Storage servers 1840A and 1840B are also connected to a SAN fabric 1870, although connection to a storage area network is not required for operation of the disclosure. SAN fabric 1870 supports access to storage devices 1880(1)-(N) by storage servers 1840A and 1840B, and also by client systems 1810, 1820 and 1830 via network 1850. Intelligent storage array 1890 is also shown as an example of a specific storage device accessible via SAN fabric 1870. In one embodiment, server 1840A includes storage management module 1899. In one embodiment, storage management module 1899 is similar to storage management module 800. It is appreciated that present systems and methods are compatible with a variety of implementations. For example, portions of information and instructions associated with can be distributed in various resources.

Figure 8:
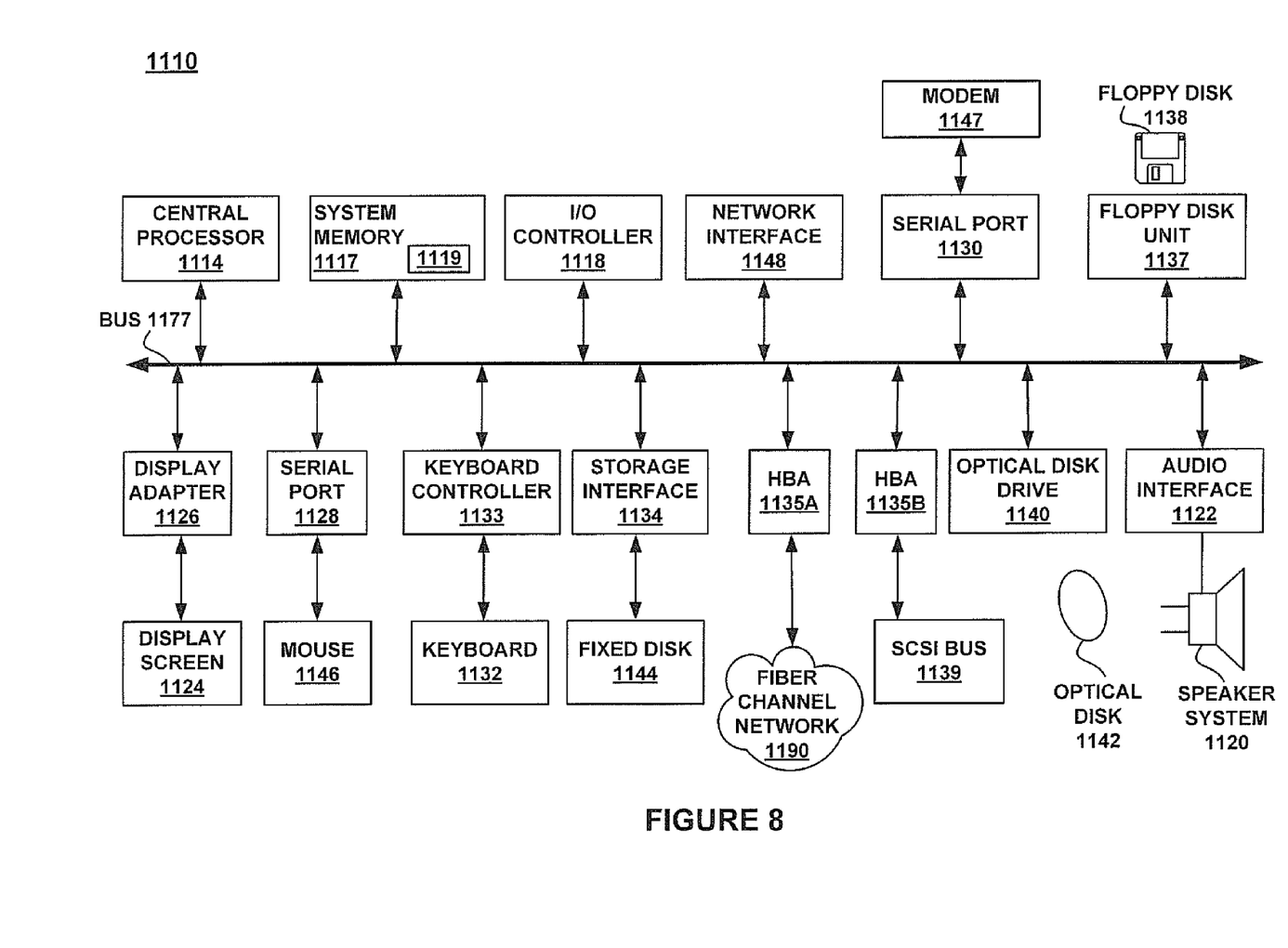
FIG. 8 depicts a block diagram of an exemplary computer system suitable for implementing the present methods in accordance with one embodiment of the present invention.

FIG. 8 depicts a block diagram of an exemplary computer system 1110 suitable for implementing the present methods. Computer system 1110 includes a bus 1177 which interconnects major subsystems of computer system 1110, such as a central processor 1114, a system memory 1117 (typically RAM, but which may also include ROM, flash RAM, or the like), an input/output controller 1118, an external audio device, such as a speaker system 1120 via an audio output interface 1122, an external device, such as a display screen 1124 via display adapter 1126, serial ports 1128 and 1130, a keyboard 1132 (interfaced with a keyboard controller 1133), a storage interface 1134, a floppy disk drive 1137 operative to receive a floppy disk 1138, a host bus adapter (HBA) interface card 1135A operative to connect with a Fiber Channel network 1190, a host bus adapter (HBA) interface card 1135B operative to connect to a SCSI bus 1139, and an optical disk drive 1140 operative to receive an optical disk 1142. Also included are a mouse 1146 or other point-and-click device (coupled to bus 1177 via serial port 1128), a modem 1147 (coupled to bus 1177 via serial port 1130), and a network interface 1148 (coupled directly to bus 1177).

Bus 1177 allows data communication between central processor 1114 and system memory 1117, which may include read-only memory (ROM) or flash memory (neither shown), and random access memory (RAM) (not shown), as previously noted. In one embodiment, instructions for performing an archival information storage configuration method (e.g., similar to method 200, 300, etc.) are stored in one or more memories of computer system 1100 (e.g., in memory location 1119). The RAM is generally the main memory into which the operating system and application programs are loaded. In one embodiment, RAM 1117 includes storage management module (e.g., in memory location 1119). In one embodiment, a storage management module stored in memory location 1119 is similar to storage management module 800. The ROM or flash memory can contain, among other code, the Basic Input-Output system (BI/OS) which controls basic hardware operation such as the interaction with peripheral components. Applications resident with computer system 1110 are generally stored on and accessed via a computer readable medium, such as a hard disk drive (e.g., fixed disk 1144), an optical drive (e.g., optical drive 1140), floppy disk unit 1137, or other storage medium. Additionally, applications can be in the form of electronic signals modulated in accordance with the application and data communication technology when accessed via modem 1147 or network interface 1148.

Storage interface 1134, as with the other storage interfaces of computer system 1110, can connect to a standard computer readable medium for storage and/or retrieval of information, such as a fixed disk drive 1144. Fixed disk drive 1144 may be a part of computer system 1110 or may be separate and accessed through other interface systems. Modem 1147 may provide a direct connection to a remote server via a telephone link or to the Internet via an internet service provider (ISP). Network interface 1148 may provide a direct connection to a remote server via a direct network link to the Internet via a POP (point of presence). Network interface 1148 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 7 need not be present to practice the present disclosure. The devices and subsystems can be interconnected in different ways from that shown in FIG. 7. Code to implement the present disclosure can be stored in computer-readable storage media such as one or more of system memory 1117, fixed disk 1144, optical disk 1142, or floppy disk 1138. The operating system provided on computer system 1110 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

With reference to computer system 1110, modem 1147, network interface 1148 or some other method can be used to provide connectivity from each of client computer systems 1810, 1820 and 1830 to network 1850. Client systems 1810, 1820 and 1830 are able to access information on network addressable storage using, for example, a transfer coordination component, a web browser, or other client software (not shown). Such a client allows client systems 1810, 1820 and 1830 to access data hosted by storage server 1840 or one of the corresponding storage devices 1180(1)-(N). FIG. 7 depicts the use of a network such as the Internet for exchanging data, but the present disclosure is not limited to the Internet or any particular network-based environment.

Thus, the presented systems and methods described above can facilitate efficient and effective storage management. In one embodiment, relatively flexible and granular fencing can be achieved without excessive impacts to storage operations.

Portions of the detailed description are presented and discussed in terms of a method. Although steps and sequencing thereof are disclosed in figures herein describing the operations of this method, such steps and sequencing are exemplary. Embodiments are well suited to performing various other steps or variations of the steps recited in the flowchart of the figure herein, and in a sequence other than that depicted and described herein. Some portions of the detailed description are presented in terms of procedures, steps, logic blocks, processing, and other symbolic representations of operations on data bits that can be performed within a computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps include physical manipulations of physical quantities. Usually, though not necessarily, these quantities take the form of electrical, magnetic, optical or quantum signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "processing", "computing", "calculating", "determining", "displaying", "accessing," "writing," "including," "storing," "transmitting," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Computing devices can include at least some form of computer readable media. Computer readable media can be any available media that can be accessed by a computing device. The computer readable medium can include reprogrammable non-transient tangible computer readable media. By way of example, and not limitation, computer readable medium may comprise computer storage media. Computer storage media includes volatile and nonvolatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by a computing device. Communication media typically embodies carrier waves or other transport mechanism and includes any information delivery media. By way of example, and not limitation, communication media includes wired media such as a wired network or direct-wired connection, and wireless media such as acoustic, RF, infrared, other wireless media, and combinations of any of the above.

Some embodiments may be described in the general context of computer-executable instructions, such as program modules, executed by one or more computers or other devices. Generally, program modules include routines, programs, objects, components, data structures, etc, that perform particular tasks or implement particular abstract data types. The functionality of the program modules may be combined or distributed as desired in various embodiments.

The foregoing descriptions of specific embodiments have been presented for purposes of illustration and description. They are not intended to be exhaustive or to limit the invention to the precise forms disclosed, and many modifications and variations are possible in light of the above teaching. The embodiments were chosen and described in order to best explain the principles and its practical application, to thereby enable others skilled in the art to best utilize the invention and various embodiments with various modifications as are suited to the particular use contemplated. It is intended that the scope be defined by the Claims appended hereto and their equivalents.

What is claimed is:

1. A method comprising:
   performing an endpoint input/output (I/O) source authority tracking process in which permission of an endpoint I/O source to perform an I/O with at least a portion of an endpoint storage target is tracked at least in part based on a corresponding endpoint I/O source ID value;
   confirming the endpoint storage target supports endpoint I/O source ID value registration and commands corresponding to registration operations; and
   performing an I/O operation based upon results of the endpoint I/O source authority tracking process, wherein the endpoint I/O source ID value is associated with the endpoint I/O source and the endpoint I/O source is a virtual machine.

2. The method of claim 1 wherein the endpoint I/O source ID value is unique to a respective endpoint I/O source and is bound to the respective endpoint I/O source, and the endpoint I/O source ID value does not depend upon intermediate communication channel characteristics between the respective endpoint I/O source and the endpoint storage target.

3. The method of claim 1 wherein the endpoint input/output (I/O) source authority tracking process includes:
   performing an endpoint I/O source ID value generation process;
   performing an endpoint I/O source ID value initial registration process; and
   performing an endpoint I/O source ID value update registration process.

4. The method of claim 1 wherein the endpoint I/O source ID value is registered in the endpoint storage target and the endpoint I/O source ID value is associated with a respective virtual machine.

5. The method of claim 1 wherein the endpoint I/O source ID value is included in a table of endpoint I/O source ID values that indicate corresponding endpoint I/O sources have valid authority or permission to perform an I/O access.

6. The method of claim 3 wherein the endpoint I/O source ID value update registration process includes:
    receiving an indication of an endpoint I/O source ID value update registration trigger; and
    updating an endpoint I/O source ID value registration based upon receipt of the endpoint I/O source ID value update registration trigger.

7. The method of claim 6 wherein the endpoint I/O source ID value registration is updated based upon receipt of an endpoint I/O source ID value update registration trigger, wherein the endpoint I/O source ID value update registration trigger includes at least one of an indication of a split link scenario and an indication of a cluster reconfiguration scenario.

8. The method of claim 1 wherein the endpoint I/O source authority tracking process includes:
    determining if a split link scenario occurs;
    establishing a surviving node; and
    confirming validity of an endpoint I/O source ID value associated with an endpoint I/O source in the surviving node.

9. The method of claim 1 wherein the endpoint I/O source ID value is included in a field of an I/O request.

10. The method of claim 9 wherein the field configuration is compatible with SCSI-3 protocol.

11. The method of claim 9 wherein the field is a Group ID field.

12. The method of claim 1 wherein the endpoint I/O source ID value is non-zero.

13. A reprogrammable non-transitory tangible computer readable medium having stored thereon, computer executable instructions that when executed by a computer system cause the computer system to perform a method comprising:
    performing an endpoint input/output (I/O) source authority tracking process in which permission of an endpoint I/O source to perform an I/O with at least a portion of an endpoint storage target is tracked at least in part based on a corresponding endpoint I/O source ID value;
    confirming the endpoint storage target supports endpoint I/O source ID value registration and commands corresponding to registration operations; and
    performing an I/O operation based upon results of the endpoint I/O source authority tracking process, wherein the endpoint I/O source ID value is associated with the endpoint I/O source and the endpoint I/O source is a virtual machine.

14. The reprogrammable non-transitory tangible computer readable medium of claim 13 wherein the endpoint I/O source ID value is unique to the endpoint I/O source and is bound to the endpoint I/O source.

15. The reprogrammable non-transitory tangible computer readable medium of claim 13 wherein the endpoint I/O source authority tracking process includes:
    determining if a split link scenario occurs; establishing a surviving node;
    confirming validity of an endpoint I/O source ID value associated with an endpoint I/O source in the surviving node; and
    invalidating the endpoint I/O source ID value associated with an endpoint I/O source in a non-surviving node.

16. A computer system comprising: a processor coupled to a non-transitory computer readable storage media and executing computer readable code which causes the computer system to perform operations including:
    performing an endpoint input/output (I/O) source authority tracking process in which permission of an endpoint I/O source to perform an I/O with at least a portion of an endpoint storage target is tracked at least in part based on a corresponding endpoint I/O source ID value;
    confirming the endpoint storage target supports endpoint I/O source ID value registration and commands corresponding to registration operations; and
    performing an I/O operation based upon results of the endpoint I/O source authority tracking process, wherein the endpoint I/O source ID value is associated with the endpoint I/O source and the endpoint I/O source is a virtual machine.

17. The computer system of claim 16 wherein the endpoint I/O source ID value is unique to the endpoint I/O source and is bound to the endpoint I/O source.

18. The computer system of claim 16 wherein the endpoint I/O source authority tracking process includes:
    determining if a split link scenario occurs; establishing a surviving node;
    confirming validity of an endpoint I/O source ID value associated with an endpoint I/O source in the surviving node; and
    invalidating the endpoint I/O source ID value associated with an endpoint I/O source in a non-surviving node.

* * * * *